Nov. 21, 1933.  J. B. ALTRUDA  1,935,605

SKIN GRAFTING APPARATUS

Filed May 3, 1932    2 Sheets-Sheet 1

INVENTOR
Joseph B. Altruda
BY
ATTORNEY

Nov. 21, 1933.   J. B. ALTRUDA   1,935,605
SKIN GRAFTING APPARATUS
Filed May 3, 1932   2 Sheets-Sheet 2

INVENTOR
Joseph B. Altruda
BY
ATTORNEY

Patented Nov. 21, 1933

1,935,605

UNITED STATES PATENT OFFICE 1,935,605

SKIN GRAFTING APPARATUS

Joseph B. Altruda, New York, N. Y.

Application May 3, 1932. Serial No. 609,001

20 Claims. (Cl. 128—305)

This invention relates to surgical instruments and more particularly refers to instruments for severing skin to be used in skin grafting operations.

In performing operations of this kind it was customary to cut the skin by means of a hand-operated blade having a keen cutting edge. This method, however, makes it extremely difficult to regulate and maintain uniform the thickness of the layer of skin stripped from the body of the patient, and also makes it almost impossible to cut the skin without causing flow of blood.

The primary object of this invention is to provide an instrument for severing the skin to be used in skin grafting operations by means of which a thin layer of epidermis of the desired thickness may be removed from the body without cutting in any deeper than absolutely necessary for the production of an entirely superficial cut.

Another object of the invention is to provide in a surgical instrument of the character specified readily adjustable means for causing the flesh to slightly bulge at a uniform height in front of the cutting edge, so as to insure the desired uniformity in the thickness of the layer of skin removed.

A further object is to provide an instrument of a novel and improved type for severing skin from the body of a patient, said instrument being designed for convenient control and manipulation by the operator, and being provided with safety means for preventing accidental deep cutting apt to result in a flow of blood.

A still further object is to provide in a surgical instrument of the character specified means for at all times clearing the path of the cutting edge, said means being designed to prevent portions of the skin already severed from curling up or accumulating in front of the cutting edge.

Other objects and advantages of the present invention will more fully appear as the description proceeds and will be set forth and claimed in the appended claims.

My invention is illustrated by way of example in the accompanying drawings, in which.

Figure 1:
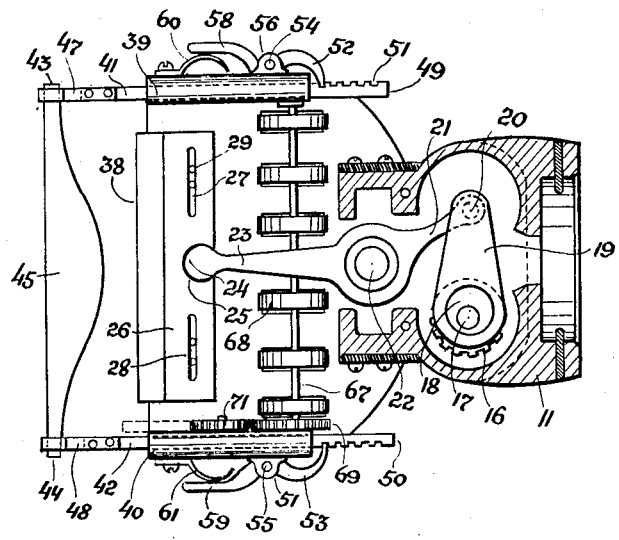
Fig. 1 is a plan view, partly sectioned, of the front part of my device with the cover removed.

The instrument comprises a hollow handle 10, and a head or front portion 11, which may be made readily attachable thereto or detachable therefrom in any suitable manner. The handle contains a small motor (not shown) which may be connected to an electric source of supply by means of a flexible conductor 12, the operation of said motor being controlled by a switch 13. The function of the motor is to rotate a shaft 14, projecting frontwardly of the handle, said shaft carrying a worm 15, adapted to mesh with a worm wheel 16 carried by a shaft 17, rotatably mounted at the rear of the head 11.

Shaft 17 also carries an eccentric 18, inserted within and causing reciprocating motion of a link 19, said link being in its turn articulatedly connected at 20 to an oscillating lever 21, pivotally mounted at 22, said lever being formed integral with a frontwardly extending arm 23.

Figure 6:
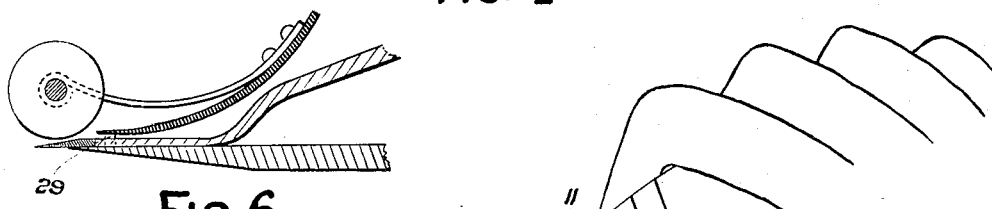
Fig. 6 is a sectional detail illustrating the manner of holding the cutting blade in position.

Said arm 23 has a quasi-round end 24, engaging a corresponding notch 25, provided in a cutting blade 26, so that the rapid reciprocating motion of link 19 will be converted into rapid reciprocating motion of blade 26. The reciprocating motion of blade 26 takes place in a transversal direction and to this end said blade is provided with two elongated slots 27, 28, cooperating in guiding the movement of the blade with pins, such as 29, upwardly extending and projecting from base plate 30, said pins projecting very slightly above the upper surface of blade 26, as Fig. 6 clearly shows.

The operating mechanism thus described, with the exception of the blade and the manner of mounting said blade, is substantially similar to the mechanism employed in certain types of hair clipping devices, such as described, for instance, in the U. S. patent to C. H. Graeff, No. 1,630,289.

The blade is held in position by means of a cover or plate 31, which is preferably made of spring metal, the front yielding portion 32 of said plate pressing against the top of pins 29, so as to form a retaining guide for the blade, said retaining guide being separated from the upper surface of the blade by a minute clearance space, just enough to prevent the spring pressure by portion 32 being exerted directly against the blade, an action which would tend to interfere with the free movement of said blade.

Figure 2:
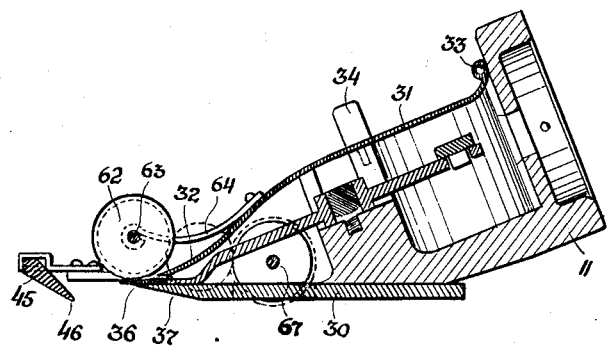
Fig. 2 is a vertical longitudinal section thereof.
Figure 3:
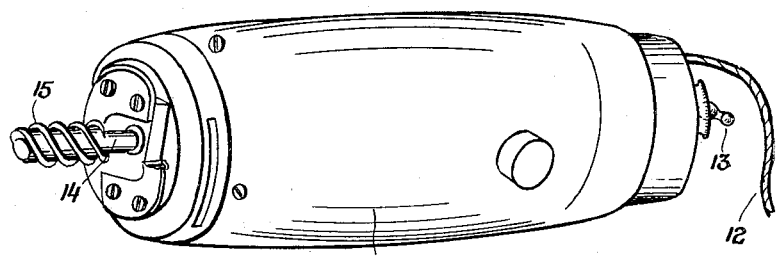
Fig. 3 is a view in perspective of the handle containing the motor actuating the device.
Figure 4:
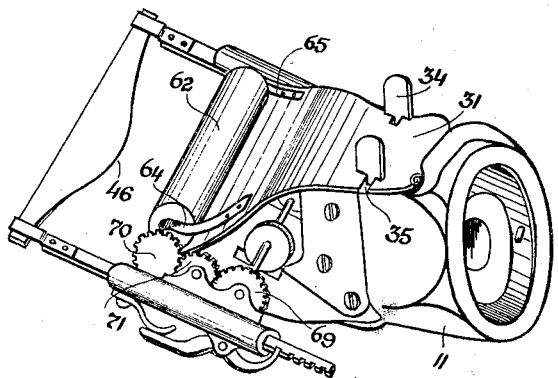
Fig. 4 is a view in perspective of the front portion of the device.

The cover or plate 31 is preferably pivoted at the rear onto head 11, as shown at 33, and may be locked in position by means of two locking bars 34, cooperating with slots, such as 35, provided in the spring plate, as Fig. 4 clearly shows. By turning locking bars 34 90° from the position shown in Figs. 2 and 4, slots 35 can clear said locking bars when the plate 31 is tilted upwardly from its normal position shown, for the purpose of removing or replacing the blade.

The front portion of base plate 30 is preferably made with its lower surface tapering up to a relatively fine edge 36, as shown at 37, said edge 36 remaining somewhat behind the cutting edge 38 of blade 26. Said base plate 30 is formed integral with two side bushings or guides 39, 40, extending in a front to rear direction, said bushings being perforated to slidably receive side bars 41, 32, respectively supporting the ends 43, 44 of the pressure plate 45.

Said pressure plate is preferably inclined inwardly and downwardly so that the central portion of its inner edge 46 is about on a level with the lower surface of base plate 30. The inner edge 46 of said pressure plate preferably has a convex outline causing said outline to bulge inwardly at the center, as shown in Figs. 1 and 4.

Pressure plate 45 is mounted onto bars 41, 42, so as to form therewith a U-shaped structure which is substantially rigid in the horizontal sense, although in the vertical sense I prefer to mount plate 45 so that it will yield to a certain extent when the instrument is passed over some protuberance caused by an underlying bone or other irregularity of the surface of the patient's body. To this end I, therefore, show the two ends 43, 44 of said plate 45 as being carried by two flat springs 47, 48, adapted to yield in a vertical sense, the rear ends of said springs being fastened onto the front ends of bars 41, 42, respectively, and the front ends of said springs extending frontwardly of said bars.

Pressure plate 45 is, of course, inclined downwardly and inwardly so that its inner edge may press against the flesh, causing the skin to bulge upwardly in front of the cutting edge of the blade.

However, if the edge 46 extended in a straight line from one end to the other of plate 45, the flesh would not bulge evenly, but would rise to a higher lever as the distance from the ends of the pressure plate increases, that is, the resulting bulge would be higher at the center than at the side portions adjoining bars 41, 42. The rounded outline of edge 46, shown, is provided for the purpose of counterbalancing this tendency to uneven bulging of the flesh, the counterbalancing action taking place by virtue of this construction being due to the fact that the central portion of edge 46 will be lower than its ends, the level of successive points along its edge becoming gradually higher from the center towards the sides. This means that the central part of the portion of flesh operated on will be depressed more than its sides, the difference in the level of the points of application of the pressure taking place gradually. The lower level of the central point of application of the pressure, therefore, counteracts the tendency of the flesh to bulge more at that point, so that by providing a proper outline for edge 46, the upper surface of the bulging flesh may be caused to be substantially parallel to the cutting edge of the blade.

It is important to note that the pressure exerted by edge 46 of plate 45 does not always cause the underlying flesh to bulge to the same extent, considerable differences taking place in this respect according to the thickness and resiliency of the fleshy part of the body which is being operated upon. As will be readily understood, if the instrument is passed over parts of the body where the flesh is thicker or softer, the tendency to bulge will be greater than if the instrument is passed over thinner tissues. It is also well to note that it is desirable for the instrument to offer the possibility of cutting layers of skin of different thicknesses, varying from an extremely fine shaving to a layer of a thickness which is substantially that of the entire epidermis.

It is, therefore, highly desirable that means be provided for counterbalancing also the varying tendency to bulge encountered in different parts of the body. To this end, the U-frame formed by bars 41, 42 and 45 is made adjustable in a front to rear direction, means being provided for setting it at different positions corresponding to different widths of the space intervening between the cutting edge of blade 26 and the pressure edge of plate 45. The adjustment of the position of plate 45 is desirably made in a quick and positive manner and therefore, I provide means for this purpose, which are adapted to be readily and conveniently operated and which provide a positive stop for the U-frame 41—45—42, in such positions as it may be set.

To this end, the rear portion 49, 50, of bars 41, 42, are made to project rearwardly of bushings 39, 40, and are formed with a series of longitudinally spaced notches such as 51, adapted to be engaged by and to interlock with pawls 52, 53, respectively. Said pawls are pivoted at 54, 55 onto lugs 56, 57, extending laterally of bushings 39, 40, preferably so as to be movable in a plane parallel to base plate 30. Said pawls are made integral with rearwardly extending arms 58, 59, respectively, against which bear springs 60, 61, urging said pawls to their notch-engaging position. It will be seen that by virtue of this construction, in order to release the U-frame 41—45—42 from the locking action of the pawls it is sufficient to press arms 58, 59 towards each other by means of the thumb and middle finger of one hand, while the other hand can be used to shift said U-frame 41—45—42 to the desired position. Said U-frame will then be locked in its new position merely by releasing the pressure against arms 58, 59.

Another desirable feature of my invention is the provision of means preventing the severed portion of the skin from curling up or accumulating in front of the cutting edge.

In order to be effective, the means provided should have the tendency to hold the skin relatively taut without exerting an undue pull upon it and the action of such means should be exerted at a point somewhat behind the cutting edge, in order to permit free and unhampered action by said edge.

Figure 5:
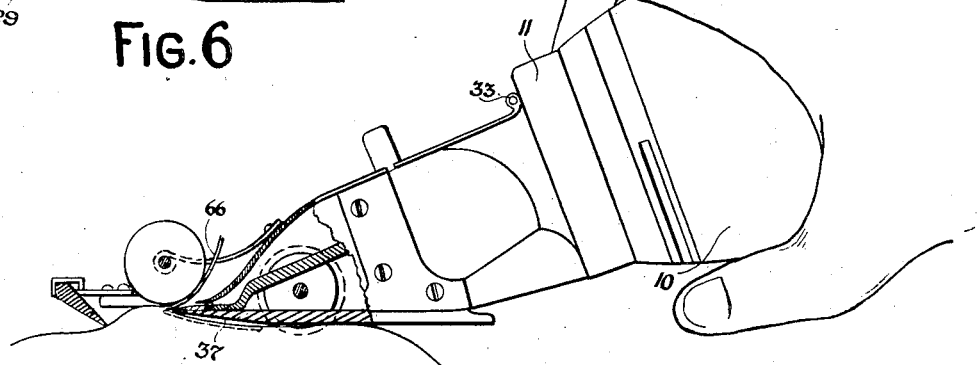
Fig. 5 is a side view in elevation, partly sectioned, showing the device in operation.

The means provided to this end comprise a roller 62 carried by a shaft 63, so positioned that the roller will press against the upper surface of cutting blade 26 slightly behind its cutting edge 38, said shaft 63 being preferably mounted on springs, such as 64, 65, so as to exert a certain pressure against the surface of blade 26. This pressure will cause a frictional pull to be exerted upon the severed portion of the skin 66, as shown in Fig. 5, causing said skin to extend to the rear of the roller during the advancing movement of the instrument. In order to exert this action roller 62 must, of course, be caused to rotate so as to cause its lower surface to move in a direction opposite to that of the advancing movement of the instrument, the surface speed of said roller being substantially equivalent or very slightly greater than the speed of advancement of the instrument.

I provide, therefore, means for rotating roller 62 in the proper direction and at the proper speed, said means being actuated by virtue of the advancing movement of the instrument itself, said means comprising a transversal shaft 67, rotatably mounted well at the rear of shaft 63, said shaft 67 carrying a number of axially spaced disks 68, the periphery of which projects slightly below the lower surface of base plate 30. The periphery of said disks has preferably a knurled surface, so that during the course of the operation when the instrument is advanced while base plate 30 rests against the surface of the patient's body, the friction of said surface against the periphery of said disks will cause them to rotate together with shaft 67 in a counterclockwise direction with respect to Figs. 2 and 5. Said movement of shaft 67 will be transmitted by a gear 68 mounted on said shaft to a gear 70 mounted on shaft 63, through the intermediary of an idler 71.

It is obvious that since the surface speed of disks 68 substantially corresponds at all times to the advancing speed of the instrument, the proper speed of rotation of roller 62 can be produced merely by correctly proportioning the diameters of gears 69, 70.

From the foregoing it will be seen that I provide an instrument for severing skin to be used in skin grafting operations, which can be very quickly and conveniently operated and which places at the disposal of the surgeon a means insuring safety for the patient, as well as uniform and satisfactory results.

By virtue of the construction advocated, the instrument can be quickly adjusted to all prevailing conditions, in order to counterbalance the tendency of the flesh to uneven bulging, which may arise from the various causes hereinbefore mentioned.

The instrument must of necessity be provided with a handle of convenient dimensions, but for the purpose of my invention it is not necessary that the motor driving the operating mechanism be mounted within said handle, since it is obvious that a flexible shaft running between a stationary motor and shaft 14, carried by handle 10, would do equally as well.

The details of construction of my device are susceptible of various modifications without departure from the inventive idea; the drawings will, therefore, be understood as being intended for illustrative purposes only and not in a limiting sense.

I accordingly reserve the right to carry my invention into practice in all those ways and manners which may enter, fairly, into the scope of the appended claims.

I claim:

1. In an instrument of the class described the combination, with a supporting frame and a blade having a front cutting edge, mounted to reciprocate transversely of the line of advance of the instrument, of a pressure exerting member extending across said line of advance in front of and longitudinally spaced from said cutting edge, said member causing bulging of the portion of flesh delimited by said member and cutting edge.

2. In an instrument of the class described the combination, with a supporting frame and a blade having a front cutting edge, mounted to reciprocate transversely of the line of advance of the instrument, of a pressure exerting member extending across said line of advance in front of and longitudinally spaced from said cutting edge, said member causing bulging of the portion of flesh delimited by said member and cutting edge, and being adjustable to and from said cutting edge.

3. In an instrument of the class described the combination, with a supporting frame and a blade having a front cutting edge, mounted to reciprocate transversely of the line of advance of the instrument, of a pressure exerting member extending across said line of advance in front of and spaced from said cutting edge, said member causing bulging of the portion of flesh delimited by said member and cutting edge, said member pressing the underlying flesh to a depth gradually increasing from the sides towards the center thereof.

4. In an instrument of the class described the combination, with a supporting frame and a blade having a front cutting edge, mounted to reciprocate transversely of the line of advance of the instrument, of a pressure exerting member extending across said line of advance in front of and spaced from said cutting edge, said member causing bulging of the portion of flesh delimited by said member and cutting edge, said member pressing the underlying flesh to a depth gradually increasing from the sides towards the center thereof, and being adjustable to and from said cutting edge.

5. In an instrument of the class described the combination, with a supporting frame and a blade having a front cutting edge, mounted to reciprocate transversely of the line of advance of the instrument, of a pressure exerting plate extending across said line of advance in front of and spaced from said cutting edge, said plate being inclined inwardly and downwardly so as to cause its inner edge to press against the underlying flesh, causing bulging of the portion thereof delimited by said inner edge and cutting edge.

6. In an instrument of the class described the combination, with a supporting frame and a blade having a front cutting edge, mounted to reciprocate transversely of the line of advance of the instrument, of a pressure exerting blade extending across said line of advance in front of and spaced from said cutting edge, said plate being inclined inwardly and downwardly so as to cause its inner edge to press against the underlying flesh, causing bulging of the portion thereof delimited by said inner edge and cutting edge, said inner edge having an inwardly bulging outline.

7. In an instrument of the class described the combination, with a supporting frame and a blade having a front cutting edge, mounted to reciprocate transversely of the line of advance of the instrument, of a pressure exerting plate extending across said line of advance in front of and spaced from said cutting edge, said plate being inclined inwardly and downwardly so as to cause its inner edge to press against the underlying flesh, causing bulging of the portion thereof delimited by said inner edge and cutting edge, and means for adjusting said pressure exerting plate towards and away from said cutting edge.

8. In an instrument of the class described the combination, with a supporting frame and a blade having a front cutting edge, mounted to reciprocate transversely of the line of advance of the instrument, of a pressure exerting plate extending across said line of advance in front of and spaced from said cutting edge, said plate being inclined inwardly and downwardly so as to cause its inner edge to press against the underlying flesh, causing bulging of the portion thereof delimited by said inner edge and cutting edge, said inner edge having an inwardly bulging outline, and means for adjusting said pressure exerting plate towards and away from said cutting edge.

9. In an instrument of the class described the combination, with a supporting frame and a blade having a front cutting edge, mounted to reciprocate transversely of the line of advance of the instrument, of a pressure exerting plate extending across said line of advance in front of and spaced from said cutting edge, said plate being inclined inwardly and downwardly so as to cause its inner edge to press against the underlying flesh, causing bulging of the portion thereof delimited by said inner edge and cutting edge, and a yielding support for said pressure exerting plate.

10. In an instrument of the class described the combination, with a supporting frame and a blade having a front cutting edge, mounted to reciprocate transversely of the line of advance of the instrument, of a pressure exerting plate extending across said line of advance in front of and spaced from said cutting edge, said plate being inclined inwardly and downwardly so as to cause its inner edge to press against the underlying flesh, causing bulging of the portion thereof delimited by said inner edge and cutting edge, said inner edge having an inwardly bulging outline, means for adjusting said pressure exerting plate towards and away from said cutting edge, and a yielding support for said pressure exerting plate.

11. In an instrument of the class described the combination, with a supporting frame and a blade having a front cutting edge, mounted to reciprocate transversely of the line of advance of the instrument, of a roller bearing against said blade along a line adjacent and slightly behind the cutting edge thereof, and means for rotating said roller to advance skin severed by said blade in a direction counter to the direction of advance of the instrument.

12. In an instrument of the class described the combination, with a supporting frame and a blade having a front cutting edge, mounted to reciprocate transversely of the line of advance of the instrument, of a roller bearing against said blade along a line adjacent and slightly behind the cutting edge thereof, and rolling means for rotating said roller to advance skin severed by said blade in a direction counter to the direction of advance of the instrument, said rolling means bearing against the surface of the body against which the instrument is applied, to be frictionally actuated thereby, and being operatively connected to said roller.

13. An instrument of the class described comprising a supporting frame, a handle therefor, a blade having a front cutting edge mounted at the front end of said frame transversely thereof, means for reciprocating said blade transversely of the line of advance of the instrument, means for maintaining the transversal alinement of said blade during its reciprocating movement, and a cover for said frame, the front edge of said cover acting as a guide for said blade, retaining said blade in its plane of movement.

14. An instrument of the class described comprising a frame, a blade having a front cutting edge mounted at the front of said frame transversely thereof, means for reciprocating said blade transversely of the line of advance of the instrument, a pressure exerting member extending across said line of advance in front of and spaced from said cutting edge, two side bars carrying said pressure exerting member, said bars being mounted within said frame so as to be slidable longitudinally thereof, and means for locking said bars at different positions with respect to said frame.

15. An instrument of the class described comprising a frame, a blade having a front cutting edge mounted at the front of said frame transversely thereof, means for reciprocating said blade transversely of the line of advance of the instrument, a pressure exerting plate extending across said line of advance in front of and spaced from said cutting edge, said plate being inclined inwardly and downwardly so as to cause its inner edge to press against the underlying flesh, said inner edge having an inwardly bulging outline, two side bars carrying said pressure exerting plate, said bars being mounted within said frame so as to be slidable longitudinally thereof, and means for locking said bars at different positions with respect to said frame.

16. An instrument of the class described comprising a frame, a blade having a front cutting edge mounted at the front of said frame transversely thereof, means for reciprocating said blade transversely of the line of advance of the instrument, a pressure exerting plate extending across said line of advance in front of and spaced from said cutting edge, said plate being inclined inwardly and downwardly so as to cause its inner edge to press against the underlying flesh, said inner edge having an inwardly bulging outline, two side bars carrying said pressure exerting plate, said bars being mounted within said frame so as to be slidable longitudinally thereof, means for locking said bars at different positions with respect to said frame, a roller bearing against said blade along a line adjacent and slightly behind the cutting edge thereof, and means for rotating said roller to advance skin severed by said blade in a direction counter to the direction of advance of the instrument.

17. An instrument of the class described comprising a supporting frame, a handle therefor, a blade having a front cutting edge mounted at the front end of said frame transversely thereof, means for reciprocating said blade transversely of the line of advance of the instrument, means for maintaining the transversal alinement of said blade during its reciprocating movement, a cover for said frame, the front edge of said cover acting as a guide for said blade, retaining said blade in its plane of movement, a spring roller carried by said cover, bearing against said blade along a line adjacent and slightly behind the cutting edge thereof, and rolling means for rotating said roller to advance skin severed by said blade in a direction counter to the direction of advance of the instrument, said rolling means bearing against the surface of the body against which the instrument is applied, to be frictionally actuated thereby, and being operatively connected to said roller.

18. An instrument of the class described comprising a frame, a blade having a front cutting edge mounted at the front of said frame transversely thereof, means for reciprocating said blade transversely of the line of advance of the instrument, a pressure exerting plate extending across said line of advance in front of and spaced from said cutting edge, said plate being inclined inwardly and downwardly so as to cause its inner edge to press against the underlying flesh, said inner edge having an inwardly bulging outline, two side bars carrying said pressure exerting plate, said bars being mounted within said frame so as to be slidable longitudinally thereof, means for locking said bars at different positions with respect to said frame, a cover for said frame, the front edge of said cover acting as a guide for said blade, retaining said blade in its plane of movement, a spring roller carried by said cover, bearing against said blade along a line adjacent and slightly behind the cutting edge thereof, and rolling means for rotating said roller to advance skin severed by said blade in a direction counter to the direction of advance of the instrument, said rolling means bearing against the surface of the body against which the instrument is applied, to be frictionally actuated thereby, and being operatively connected to said roller.

19. An instrument of the class described comprising a supporting frame, a handle therefor, a blade having a front cutting edge mounted on said frame to reciprocate transversely of the line of advance of the instrument, a pressure exerting member extending across said line of advance in front of and longitudinally spaced from said cutting edge, said member causing bulging of the portion of flesh delimited by said member and cutting edge, and an electric motor and operating mechanism for said blade, mounted within said handle.

20. An instrument of the class described comprising a supporting frame, a handle therefor, a blade having a front cutting edge mounted on said frame to reciprocate transversely of the line of advance of the instrument, a pressure exerting member extending across said line of advance in front of and longitudinally spaced from said cutting edge, said member causing bulging of the portion of flesh delimited by said member and cutting edge, means carried by said frame to advance skin severed by said blade in a direction counter to the direction of advance of the instrument, and an electric motor and operating mechanism for said blade, mounted within said handle.

JOSEPH B. ALTRUDA.